United States Patent Office 3,225,035
Patented Dec. 21, 1965

3,225,035
AMINOALKYL ESTERS OF ETIOCHOLENIC ACID
Manfred E. Wolff, San Bruno, Calif., assignor to Smith Kline & French Laboratories, Philadelphia, Pa., a corporation of Pennsylvania
No Drawing. Filed Feb. 12, 1964, Ser. No. 344,251
5 Claims. (Cl. 260—239.5)

This invention relates to novel new steroidal esters of the etiocholenic acid series. These esters have been found to have pharmacodynamic activity especially as hypocholesterolemic agents. In addition they are useful intermediates for preparing their 3-keto-$\Delta^{4,5}$-analogues by methods known to the art. The latter compounds also have similar pharmacodynamic activity.

The compounds of this invention are illustrated by the structural formula:

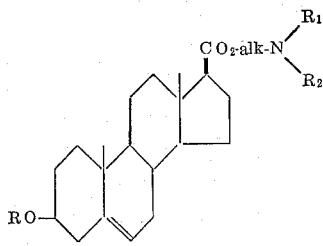

Formula I in which:

R represents lower alkyl of 1–6 carbon atoms, acyl derived from carboxylic acids having a maximum of 6 carbon atoms or preferably hydrogen;
alk represents a straight or branched alkylene chain of from 2–6 carbon atoms separating the oxygen and nitrogen atoms by at least two but preferably not more than three carbon atoms; and
$R_1$ and $R_2$ are lower alkyl of 1–6 carbons or, taken together, a basic heterocyclic end group of a maximum of 15 carbon atoms such as piperidyl, morpholinyl, thiomorpholinyl, pyrrolidinyl, N-lower alkylpiperazinyl and hexahydroazepinyl.

Lower alkyl is used herein to designate straight or branched, saturated or unsaturated hydrocarbon chains of 1–6 carbon atoms. When unsaturated such groups have a minimum of 3 carbon atoms as in the allyl moiety.

The compounds of this invention particularly those in which alk is a maximum of 3 carbon atoms are in general prepared by reacting the appropriate etiocholenic acid derivative with an alkylaminoalkyl halide, i.e. bromide, chloride or iodide usually in alcoholic solution at elevated temperatures. Preferably the reaction is run at reflux temperature in isopropanol, methanol or ethanol for from about 1 to 12 hours.

The desired product is most often recovered from the reaction mixture as the acid addition salt by concentrating the mixture. The residue is purified by fractional recrystallization such as from isopropanol.

If the bases are desired they are easily prepared by shaking the acid addition salt in a nonpolar organic solvent-aqueous base solution such as an ether-sodium carbonate solution mixture. The organic layer is separated and evaporated to recover the desired base. This base can then be converted into other salts by reaction with nontoxic inorganic acids such as sulfuric, phosphoric, sulfamic, etc., acid, said nontoxic organic salts such as acetic, benzoic, maleic, ethanedisulfonic, pamoic, etc. acid or with active quaternizing agents such as lower alkyl chlorides, bromides or iodides, methyl sulfate, etc. The resulting pharmaceutically acceptable, nontoxic acid addition or quaternary salts are part of this invention.

The 3-ester or ether derivatives can alternatively be prepared by reacting the 3-ol compound of Formula I with acyl halides or anhydrides in the presence of pyridine as well as with ether forming agents such as an alkyl halide or diazomethane in methods known to the art.

The 3-ol-$\Delta^{5,6}$-compounds of Formula I are used as intermediates for preparing the 3-keto-$\Delta^{4,5}$ congeners via the Oppenauer oxidation or similar reaction as known in theart. Variations in this reaction are described in Organic Reactions, 6, 255–234. These compounds also have hypocholesterolemic activity.

Other variations of the described invention will be obvious to those skilled in the art such as insertion of halogen, methyl, hydroxy or keto substituents into the steroid nuclear. If the basic 3-ol-$\Delta^{5,6}$ nucleus is present in such etiocholenic acid esters such variations are considered within the ambit of this invention. The trivial term etiocholenic acid is used herein generically to mean derivatives of 3$\beta$-hydroxyandrost-5-ene-17$\beta$-carboxylic acid. The following examples are designed to illustrate but not limit this invention.

*Example 1*

A solution of 1 g. (0.0031 mole) of etiocholenic acid, 0.4 g. of $\beta$-diethylaminoethyl chloride and 25 ml. of isopropanol is heated at reflux for two hours. The cooled solution is evaporated under reduced pressure to leave a crystalline solid. Recrystallization from isopropanol gives 2-diethylaminoethyl etiocholenate hydrochloride, M.P. 255–257° C.

The salt (300 mg.) is shaken with a mixture of ether and sodium carbonate solution. The ethereal layer is separated, dried and evaporated to leave 2-diethylaminoethyl etiocholenate.

The base is dissolved in ether and divided into two aliquots. One is reacted with maleic acid in ethyl acetate to give the maleate salt. The other is reacted with an excess of ethyl iodide at gentle heat to give the ethiodide quaternary.

*Example 2*

A solution of 500 mg. of etiocholenic acid, 0.2 g. of 1-(3'-chloropropyl)-4-methylpiperazine and 75 ml. of methanol is heated at reflux for 6 hours. The cooled solution is evaporated to give 4-methylpiperazinylpropyl etiocholenate hydrochloride.

*Example 3*

A solution of 750 mg. of etiocholenic acid, 2.5 g. of 1-chloro-2-(pyrrolidinylmethyl)-butane and 50 ml. of isopropanol is heated at reflux for two hours. Working up as described above gives 2-pyrrolidinylmethylbutyl etiocholenate hydrochloride.

Substituting equimolar quantities for the halide in Example 1 and using 3-chloro-1-(N-thiomorpholinyl)-propane gives 3-(thiomorpholinyl)-propyl etiocholenate hydrochloride; 3-chloro-1-hexahydroazepinylpropane gives 3-hexahydroazepinylpropyl etiocholenate hydrochloride; dimethylaminoethyl iodide gives 2-dimethylaminoethyl etiocholenate hydroiodide; 3-chloro-1-(morpholinyl)propane gives 3-morpholinylpropyl etiocholenate hydrochloride and 3-piperidyl-1-bromopropane gives 3-piperidylpropyl etiocholenate hydrobromide.

Example 4

A mixture of 500 mg. of 2-diethylaminoethyl etiocholenate in ether with an excess of diazomethane ether solution is allowed to stand overnight in a closed container. The ethereal solution is washed, dried and evaporated to give the 3-methyl ether derivative.

Example 5

A mixture of 750 mg. of 2-diethylaminoethyl etiocholenate hydrochloride and 10 ml. of pyridine with 500 mg. of acetyl chloride is allowed to stand overnight.

After quenching in water, the desired 3-acetate is taken into ether and isolated by washing and evaporating the solvent.

Example 6

A mixture of 1 g. of diethylaminoethyl etiocholenate, 150 ml. of toluene, 10 ml. of cyclohexanone and 2 g. of aluminum isopropoxide is refluxed with slow distillation for about four hours. Five ml. of water is added to cooled reaction mixture which is then filtered. The filtrate is steam distilled to remove toluene and cyclohexanone. The cooled residue containing the crude diethylaminoethyl etiocholene-3-one-17-carboxylate is extracted with methylene chloride which is washed with water, dried and evaporated. The residue is dissolved in isopropanol then acidified with hydrogen bromide gas to give the hydrobromide.

The remaining etiocholenic esters disclosed in Examples 1–3 are similarly oxidized to the 3-one-$\Delta^{4,5}$ compounds.

What is claimed is:

1. A member selected from the group consisting of a steroidal base, its pharmaceutically acceptable salts with nontoxic carboxylic acids and its pharmaceutically acceptable nontoxic quaternary salts, said steroidal base having the formula:

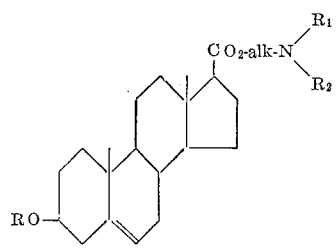

in which:

R is a member selected from the group consisting of lower alkyl of 1–6 carbon atoms, acyl derived from a carboxylic acid of a maximum of 6 carbon atoms and hydrogen;

$R_1$ and $R_2$ are members selected from the group consisting of lower alkyl of 1–6 carbon atoms and, when taken together with the nitrogen atom, piperidyl, morpholinyl, thiomorpholinyl, pyrrolidinyl, N-lower alkylpiperazinyl and hexahydroazepinyl; and alk is an alkylene chain of from 2–6 carbon atoms.

2. Diethylaminoethyl etiocholenate.

3. 4-methylpiperazinylpropyl etiocholenate hydrochloride.

4. The 3-methyl ether of diethylaminoethyl etiocholenate.

5. The 3-acetate ester of diethylaminoethyl etiocholenate.

References Cited by the Examiner

UNITED STATES PATENTS 2,763,645    9/1956    Bloom _____ 260—239.5

LEWIS GOTTS, *Primary Examiner.*